United States Patent
Tokuhiro

[11] Patent Number: 6,088,364
[45] Date of Patent: Jul. 11, 2000

[54] INTERFACE APPARATUS CONNECTING BETWEEN MULTIMEDIA NETWORK AND MUSIC NETWORK

[75] Inventor: Taro Tokuhiro, Hamamatsu, Japan

[73] Assignee: Yamaha Corporation

[21] Appl. No.: 08/892,193

[22] Filed: Jul. 14, 1997

[30] Foreign Application Priority Data

Jul. 15, 1996 [JP] Japan .................................. 8-185138

[51] Int. Cl.⁷ .............................. H04L 5/22; H04L 12/56; G10H 7/00
[52] U.S. Cl. ............................................................ 370/466
[58] Field of Search .................................. 370/600, 401, 370/465, 466–467; 704/200, 201, 202, 203, 258, 259

[56] References Cited

U.S. PATENT DOCUMENTS

| | | |
|---|---|---|
| 5,121,491 | 6/1992 | Sloan et al. . |
| 5,323,392 | 6/1994 | Ishii et al. .............................. 370/466 |
| 5,483,535 | 1/1996 | McMillen et al. . |
| 5,559,962 | 9/1996 | Okamura et al. . |
| 5,581,558 | 12/1996 | Horney, II et al. ..................... 370/466 |
| 5,826,017 | 10/1998 | Holzmann ............................... 370/466 |
| 5,870,400 | 2/1999 | Van Loon et al. ...................... 370/466 |

FOREIGN PATENT DOCUMENTS

| | | |
|---|---|---|
| 0 531 670 | 3/1993 | European Pat. Off. . |
| 0 551 884 | 7/1993 | European Pat. Off. . |
| 43 26 789 | 2/1995 | Germany . |
| 4-18835 | 1/1992 | Japan . |
| 6-177897 | 6/1994 | Japan . |

*Primary Examiner*—Ricky Ngo
*Attorney, Agent, or Firm*—Graham & James LLP

[57] ABSTRACT

An interface apparatus connects between a first node involved in a multimedia network which generally treats multimedia information including music information transferred in a generalized protocol, and a second node involved in an musical network which specially treats music information transferred in a specialized protocol. The interface apparatus has an input device that operates when the second node communicates with the first node for converting the music information from the specialized protocol into the generalized protocol so that the first node can admit the music information from the second node, and an output device that operates when the first node communicates with the second node for converting the music information from the generalized protocol into the specialized protocol so that the second node can admit the music information from the first node. Typically, the input device and the output device are integrated in the first node.

23 Claims, 10 Drawing Sheets

INTERFACE APPARATUS CONNECTING BETWEEN MULTIMEDIA NETWORK AND MUSIC NETWORK

BACKGROUND OF THE INVENTION

The present invention relates to a network interface apparatus for use in connecting between a general-purpose multimedia network carrying multimedia information of various types and a music network dedicated to electronic musical instruments, the dedicated network carrying information for controlling electronic musical instruments.

Conventionally, in the field of electronic musical instruments, a plurality of devices such as a keyboard, a tone generator, a sequencer and a mixer can be interconnected to constitute a music network system for performing data communication among these devices. Such a system can present automatic performance, ensemble performance and live performance, and can make composition, arrangement and recording of music. For a standard for carrying out data communication among the plurality of devices, MIDI is available in the field of electronic musical instruments. The devices complying with the MIDI standard are generally referred to as MIDI devices, which are in widespread use.

However, a communication protocol based on the MIDI standard has a relatively slow data transmission speed or bit rate. Especially, when many devices are interconnected to each other, such a MIDI protocol is inadequate for effectively operating the above-mentioned system in its entirety. The MIDI standard limits the transmission speed to 31.25 Kbits/sec. One of the reasons of this limitation is that some devices are limited in data transfer rate which is an amount of information that can be transferred in a unit time, due to poor internal processing ability or design limitation of these devices. Other devices, however, are fully compatible with fast transmission speeds higher than 31.25 Kbits/sec. Therefore, the current MIDI standard prevents these fast devices from providing full capabilities inherent thereto.

An advanced network system constitutes a LAN involving electronic musical instruments and other electronic equipments such as audio and video devices, instead of being constituted by electronic musical instruments alone. Since the current MIDI standard supports only unidirectional communication, it is difficult with the MIDI standard to network electronic equipments of bi-directional communication types together with electronic musical instruments of unidirectional communication type. This problem may be overcome by constituting a network system based on bi-directional communication protocol.

However, construction of a network with a protocol not supported by the MIDI standard presents another problem of making no more use of software resources such as programs and performance data developed in compliance with the MIDI standard and hardware resources such as MIDI devices and peripheral units.

SUMMARY OF THE INVENTION

It is therefore an object of the present invention to provide a network system interface apparatus for networking electronic musical instruments and other electronic equipments with one another, and for making the most of conventional MIDI hardware and software resources.

According to the invention, an interface apparatus connects between a first node involved in a multimedia network which generally treats multimedia information including music information transferred in a generalized protocol, and a second node involved in an musical network which specially treats music information transferred in a specialized protocol. The interface apparatus comprises an input device that operates when the second node communicates with the first node for converting the music information from the specialized protocol into the generalized protocol so that the first node can admit the music information from the second node, and an output device that operates when the first node communicates with the second node for converting the music information from the generalized protocol into the specialized protocol so that the second node can admit the music information from the first node. Typically, the input device and the output device are integrated in the first node.

Preferably, the input device unconditionally converts the music information transmitted by the second node such that the first node having a relatively large capacity receives all messages contained in the music information, while the output device conditionally converts the music information transmitted by the first node such that the second node having a relatively small capacity receives only messages necessary for the second node. Specifically, the output device is integrated in the first node and selectively converts only messages which are provisionally designated by the second node. Further, the output device operates when the second node suffers from overflow of the music information for selectively converting only indispensable messages so as to resolve the overflow. In an practical form, the input device converts the music information from the specialized protocol determined according to MIDI standard into the generalized protocol determined according to IEEE1394 standard, while the output device converts the music information from the generalized protocol determined according to IEEE1394 standard into the specialized protocol determined according to MIDI standard.

DETAILED DESCRIPTION OF EMBODIMENTS

Figure 1:
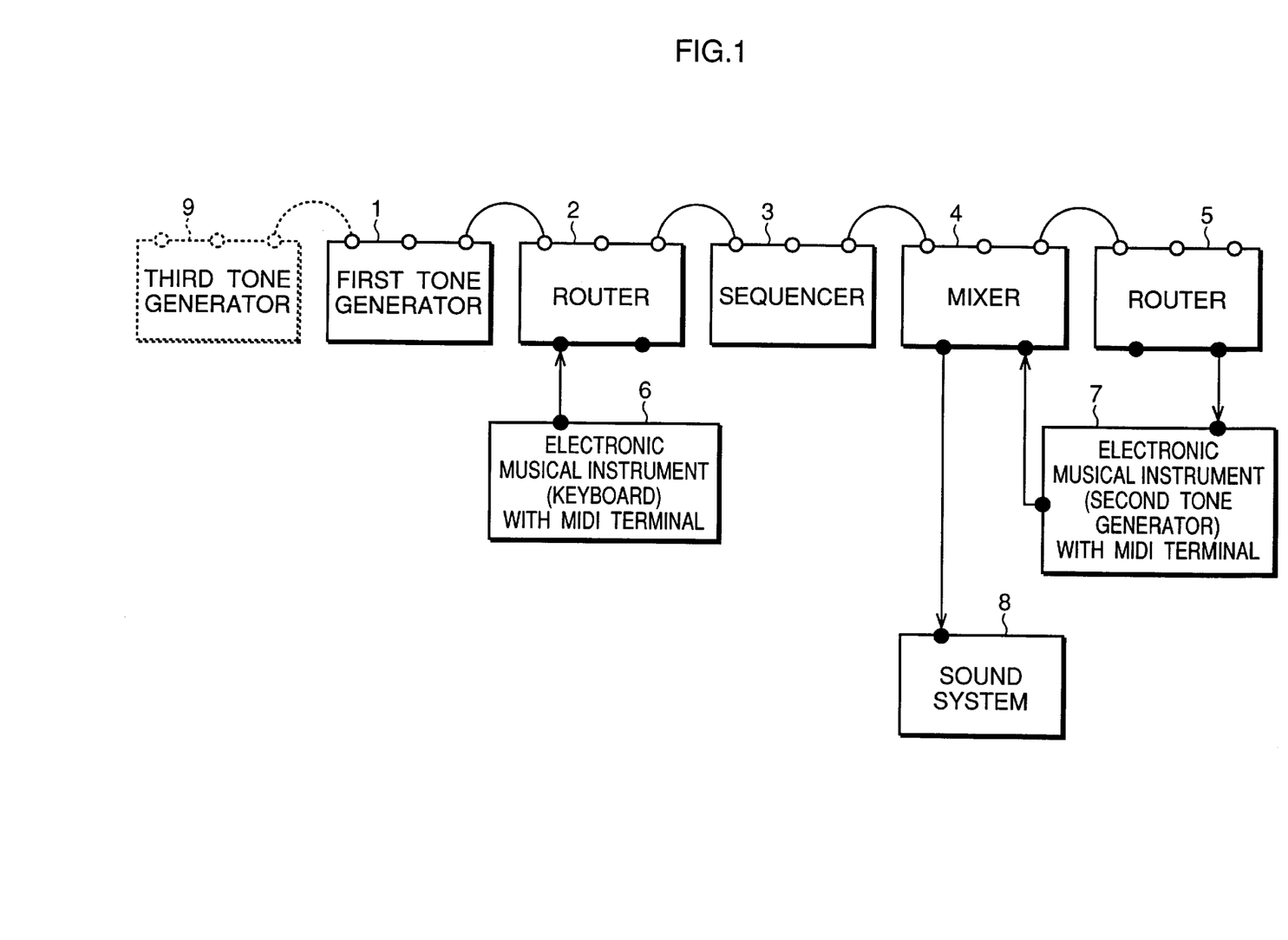
FIG. 1 is block diagram illustrating physical connection of a network system using an interface apparatus practiced as one embodiment of the present invention.
Figure 2:
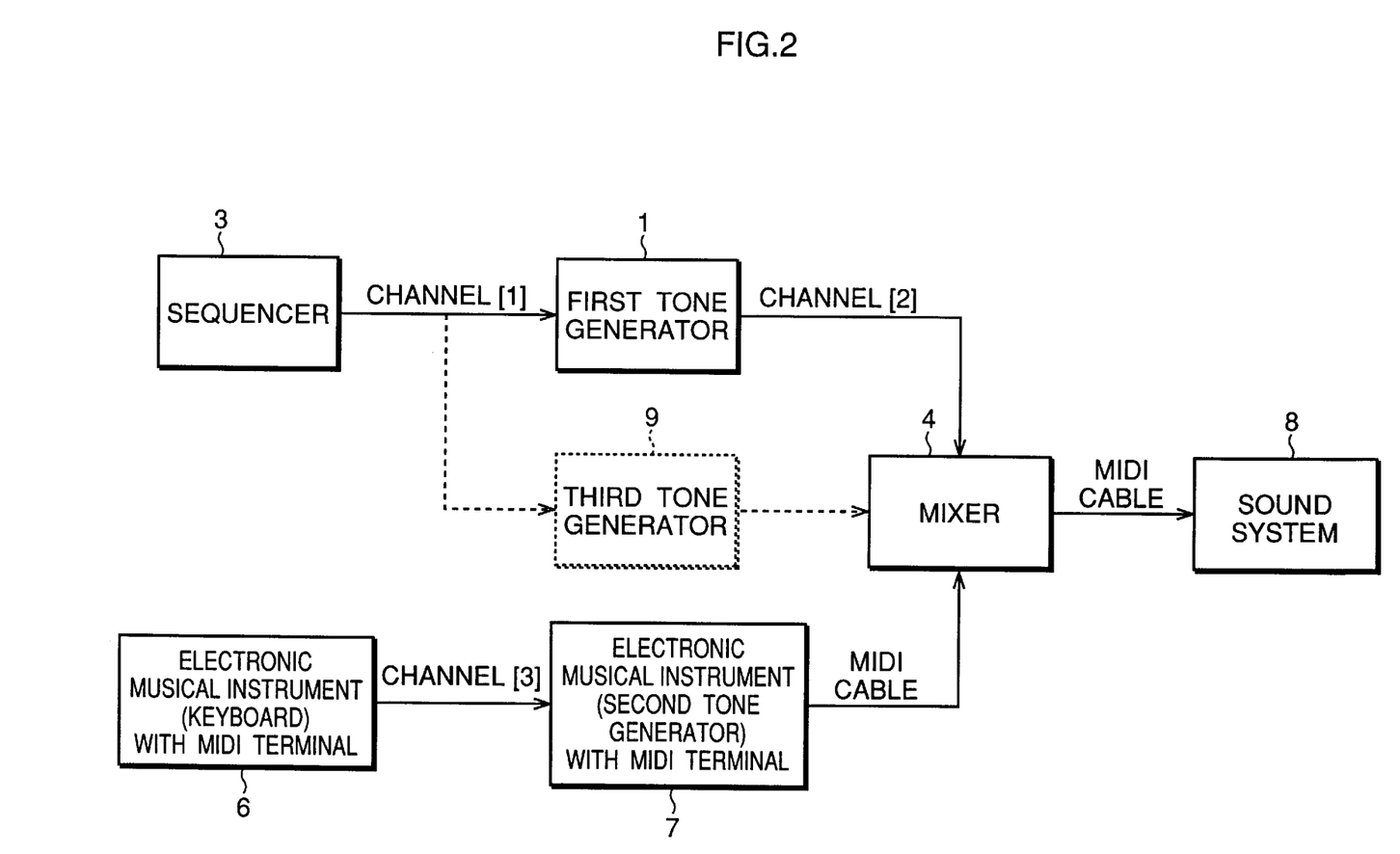
FIG. 2 is a block diagram illustrating an example of logical connection relationship of the network system shown in FIG. 1.

FIG. 1 is block diagram illustrating physical connection of a network system using an interface apparatus practiced as one embodiment of the present invention. FIG. 2 is a block diagram illustrating an example of logical connection relationship of the network system shown in FIG. 1. It should be noted that, in this embodiment, the interface apparatus is referred to as a router. This network system consists of a first network and a second network. The first network is composed of first nodes such as a first tone generator 1, a router 2, a sequencer 3, a mixer 4 and a router 5. The second network is composed of second nodes such as an electronic musical instrument 6 in the form of a keyboard having a MIDI terminal and another electronic musical instrument 7 in the form of a second tone generator having a MIDI terminal together with the router 2 and the router 5. It should be noted that the electronic musical instrument 7 is connected to the mixer 4 with an analog audio cable. A sound system 8 composed of an amplifier, a loudspeaker and so on is connected to the mixer 4 with another analog audio cable.

The first network performs bi-directional serial communication based on IEEE1394 standard. Each node is connected to other nodes with cables of the IEEE1394 standard through a terminal called a port which is indicated by a thin white in FIG. 1. The second network performs unidirectional serial communication based on the MIDI standard. Each node is connected to other nodes via a MIDI input terminal and a MIDI output terminal, which are indicated by a black circle in FIG. 1. Namely, in FIG. 1, IEEE1394 communication is performed in paths indicated by a curved line, while MIDI communication is performed in paths indicated by an arrow line. It should be noted that the input and output on the mixer 4 are analog audio. The second network also include IEEE1394 communication performed between the router 2 and the router 5 in addition to the MIDI communication performed by the MIDI instruments 6 and 7.

It should be noted that the first network constitutes a general-purpose network or multimedia network. The first network can be also connected to electronic equipments such as audio and video devices other than an electronic musical instrument as long as these devices are based on the IEEE1394 standard. In the second network, the paths provided for performing the MIDI communication constitute a special network or music network to which MIDI devices are specifically connected. It should be noted that the MIDI input terminal and the MIDI output terminal are illustrated only with respect to the nodes of the second network.

In the first network built up according to a generalized protocol of the IEEE1394 standard, roles of the involved nodes are not parallel or equivalent to each other. For example, as shown in FIG. 2, the network is dynamically constructed such that the logical connection relationship becomes a tree structure. Each node performs a variety of operations according to the logical connection relationship.

In addition, each node acquires an address as an identification code by a dynamic method. For example, at starting network configuration upon power-on, each node temporarily sets an address at random, checks whether the address is already used by another node, and, if no conflict is found, establishes that address as its own address.

It should be noted that a third tone generator 9 may be introduced into the existing network system as indicated by dashed lines in FIG. 1 and FIG. 2. If such a new node is connected or an existing node is disconnected, a special signal called a bus reset is outputted from a mate node adjacent to the newly connected or disconnected node, upon which the addresses of the nodes are reset and the logical structure of the network is rebuilt.

Each node belonging to the first network has a 1394 interface for transferring data according to the IEEE1394 standard. A functional unit of the interface operating based on the 1394 interface is called a "plug." Each plug is assigned with a channel for transmission or reception. Namely, each node performs information transfer with other nodes via channels corresponding to a pair of transmission and reception plugs of mutual nodes. The plug of each node is given such information as plug name, distinction between transmission "$T_x$" and reception "$R_x$", channel number, type of data (Data Type) to be transferred, transfer rate set to the plug, and capability of transfer rate (maximum value and default value) at which transmission and reception unique to the plug are enabled, as shown in Table below.

| Device name | Plug name | Transmit/ receive | Channel | Data-Type | Transfer rate | Capability (maximum) | Capability (default) |
|---|---|---|---|---|---|---|---|
| First tone generator | MIDI IN | Rx | 1 | MIDI message | — | 128 Kbit/sec | 31.25 Kbit/sec |
|  | PCM OUT | Tx | 2 | PCM data | — | 44 KHz (16 bit) × 2 | 44 KHz (16 bit) × 2 |
| Sequencer | MIDI OUT | Tx | 1 | MIDI message | — | 128 Kbit/sec | 31.25 Kbit/sec |
|  | MIDI IN | Rx | 1 | MIDI message | — |  |  |
| Router | MIDI OUT | Tx | 3 | MIDI message | — | 31.25 Kbit/sec | 31.25 Kbit/sec |
|  | MIDI IN | Rx | 3 | MIDI message | — |  |  |
| Mixer | PCM IN | Rx | 2 | PCM data | — | 44 KHz (16 bit) × 8 | 44 KHz (16 bit) × 8 |
| Third tone generator | MIDI IN | Rx | 1 | MIDI message | — | 31.25 Kbit/sec | 31.25 Kbit/sec |
|  | PCM OUT | Tx | 2 | PCM data | — | 22 KHz (16 bit) × 2 | 22 KHz (16 bit) × 2 |

It should be noted that the IEEE1394 standard defines a generalized protocol for transferring data by use of packets having a predetermined format. As shown in the above listed plug information, Data_Type of "MIDI message" denotes that the plug handles a MIDI message included in a packet. Data_Type "PCM data" denotes that the plug handles PCM data which represents musical tone waveform data included in a packet. "MIDI IN, MIDI OUT, PCM OUT, PCM IN" in the plug name denotes handling of the above-mentioned types of data. This is different from "MIDI IN terminal" and "MIDI OUT terminal" in the MIDI interface.

Referring to FIG. 1, the router 2 and the router 5 are interface nodes for connecting the first network (IEEE1394) to the second network (MIDI). The router 2 and the router 5 transfer all MIDI data coming from the second network to the first network. As for the data from the first network, the router 2 and the router 5 select only the MIDI data for electronic musical instrument control, and transfer the selected data to the second network. Further, if specific MIDI data is requested by a destination node, the router 2 and the router 5 transfer only that MIDI data to the requesting node.

The network system operates by the above-mentioned data transfer in the first network based on the IEEE1394 and the data transfer in the second network based on the MIDI and IEEE1394. For example, given the connection relationship shown in FIG. 2, music performance data outputted from the sequencer 3 is transferred by the IEEE1394 to the first tone generator 1. The first tone generator generates PCM data (musical tone waveform data) representing musical sound according to the performance data. The PCM data generated by the first tone generator 1 is transferred by the IEEE1394 to the mixer 4. Performance data generated by the electronic musical instrument 6 of the keyboard type is transferred by the IEEE1394 to the router 2 and the router 5, from which the performance data is transferred by the MIDI to the electronic musical instrument 7 of the second tone generator type. When PCM data is generated by the tone generator of this electronic musical instrument 7, the PCM data is transferred to the mixer 4 by an analog audio cable. The mixer 4 synthesizes the PCM data from the first tone generator 1 (or the third tone generator 9) and the analog audio data from the electronic musical instrument 7, and outputs the synthesized data to the sound system 8 by an analog audio cable. The sound system 8 generates a musical sound based on the synthesized analog audio data. As indicated by the channel number of each plug in Table, the sequencer 3 and the first tone generator 1 (or the third tone generator 9) transfer data via channel [1], and the first tone generator 1 and the mixer 4 transfer data via channel [2]. The router 2 and the router 5 transfer data via channel [3].

It should be noted that, in each network, "transmission speed" denotes a bit rate at which a signal actually flows through the cable. Namely, the transmission speed of the IEEE1394 standard in the first network is a constant value in a range of 100 Mbits/sec to 400 Mbits/sec. The transmission speed of the MIDI standard in the second network is a constant value of 31.25 Kbits/sec. On the other hand, "transfer rate" denotes processing capacity of each node in terms of a data amount per packet transferred between nodes or a data amount per unit time by which the node transfers data continuously without interruption. Namely, the transfer rate of the MIDI data in the second network corresponds to the transmission speed of 31.25 Kbits/sec as in the conventional practice, but the transfer rate of the data based on the IEEE1394 in the first network is adapted to be automatically set for each channel. For example, as shown in Table, the plug of each node has a maximum value and a default value for the capability of transmission speed. Each node exchanges data with one another by the maximum value as much as possible. Actually, the mate nodes set a critical receiving speed available by one node having the lowest receiving capability. The data is transmitted and received by all plugs through the same channel at the critical speed which is therefore the data transfer rate of that channel.

It should be noted that automatic setting of this transfer rate is performed after the address and logical structure of the first network have been established. When the address resetting and the logical restructuring have been performed, this transfer rate is also reset. For example, as shown in Table, the [MIDI OUT] plug of the sequencer 3 and the [MIDI IN] plug of the first tone generator 1 are interconnected by channel [1]. The transfer rate of this channel [1] is set to 128 Kbits/sec because the respective maximum values available by the sequencer 3 and the tone generator 1 are both 128 Kbits/sec. When the third tone generator 9 is introduced into the network, the [MIDI IN] plug of the third tone generator 9 is also connected to channel [1]. If the maximum value of the [MIDI IN] plug of the third tone generator 9 is 31.25 Kbits/sec, the transfer rate of channel [1] is reset to 31.25 Kbits/sec.

Figure 3:
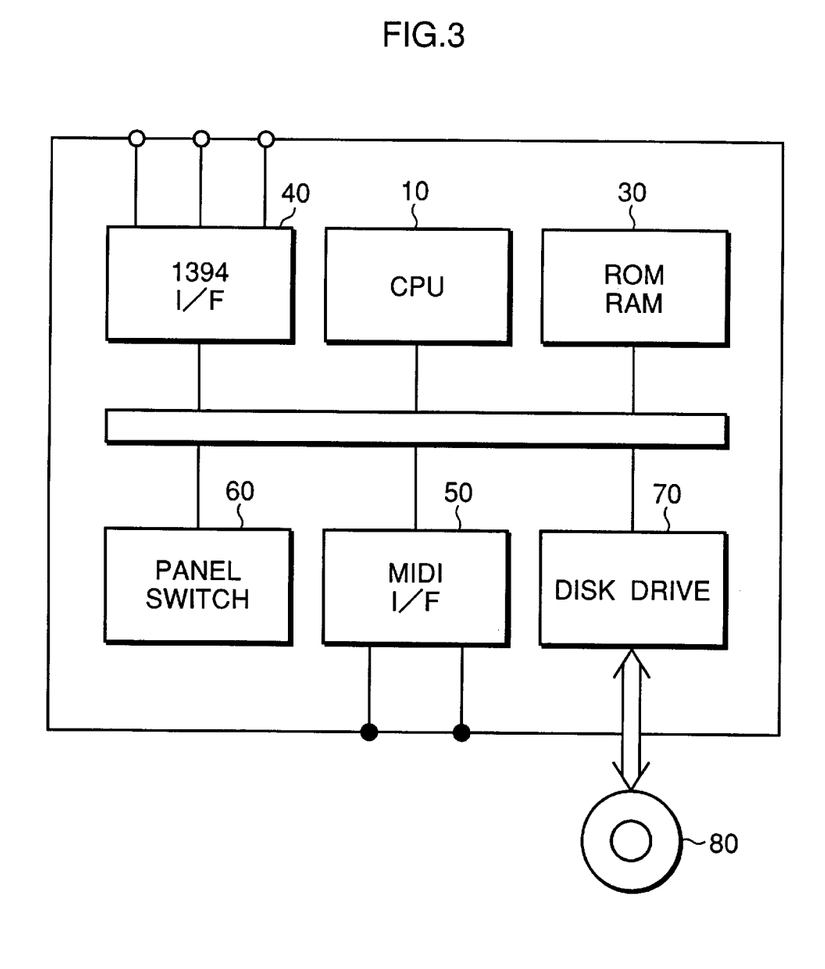
FIG. 3 is a block diagram illustrating configuration of a router node involved in the inventive network.

FIG. 3 is a block diagram illustrating configuration of the router 2 (or the router 5) as a node example. A CPU 10 is connected to a memory 30, a 1394 interface 40, a MIDI interface 50, a panel switch 60, and a disk drive 70 via a bus 20. The CPU 10 controls the router in its entirety based on a program stored in a ROM of the memory 30 while using a working area in a RAM of the memory 30. The disk drive 70 is selected from one or more of hard disk drive, floppy disk drive, and compact disk drive. The disk drive 70 receives a machine readable media 80 such as a CD disk and a floppy disk which contains programs executed by the CPU 10.

To be more specific, the router transfers packet data to and from another node belonging to the first network via the 1394 interface 40 according to the modern IEEE1994 protocol. Further, the router transfers MIDI data to and from another node belonging to the second network via the MIDI interface 50 according to the classic MIDI protocol. Still further, the router selects the MIDI data from the data received at the 1394 interface 40 and sends out the selected MIDI data to another node from the MIDI interface 50. Yet further, the router sends out the MIDI data received at the MIDI interface 50 to another node from the 1394 interface 40 as packet data.

The above description has been made by using the router 2 (or the router 5) as an example of a node. In another example, each of other nodes (the first tone generator 1, the sequencer 3, and the mixer 4) belonging to the first network has the same 1394 interface, CPU, memory, MIDI interface, analog input terminal and A/D converter in addition to circuits unique to the node, and performs data transfer based on the IEEE1394 standard and the MIDI standard.

On the other hand, the electronic musical instruments 6 and 7 having MIDI terminals and belonging to the second network are MIDI devices having the MIDI interface, the CPU, the memory and so on, but having no 1394 interface. These MIDI devices cannot perform data transfer by the IEEE1394 standard. However, the insertion of the router 2 and the router 5 as described above allows these MIDI devices to communicate with the first network.

According to the invention, the interface apparatus in the form of the router 2 or 5 connects between a first node such as the sequencer 3 and the mixer 4 involved in the first multimedia network which generally treats multimedia information including music information transferred in the generalized protocol according to the IEEE1394 standard, and a second node such as the MIDI instruments 6 and 7 involved in the second musical network which specially treats music information transferred in the specialized protocol according to the MIDI standard. The interface apparatus comprises an input device in the form of a MIDI input plug provided in the MIDI interface 50 that operates when the second node such as the MIDI instrument 6 communicates with the first node for converting the music information from the specialized protocol into the generalized protocol so that the first node can admit the music information from the second node, and an output device in the form of a MIDI output plug provided in the MIDI interface 50 that operates when the first node communicates with the second node such as the MIDI instrument 7 for converting the music information from the generalized protocol into the specialized protocol so that the second node can admit the music information from the first node. Typically, the input device and the output device are integrated in the router nodes 2 and 5 which are specific ones of the first nodes.

Preferably, the input device unconditionally converts the music information transmitted by the second node such that the first node having a relatively large capacity receives all messages contained in the music information, while the output device conditionally converts the music information transmitted by the first node such that the second node having a relatively small capacity receives only messages necessary for the second node. Specifically, the output device is integrated in the first node and selectively converts only messages which are provisionally designated by the second node. Further, the output device operates when the second node suffers from overflow of the music information for selectively converting only indispensable messages so as to resolve the overflow. In an practical form, the input device converts the music information from the specialized protocol determined according to MIDI standard into the generalized protocol determined according to IEEE1394 standard, while the output device converts the music information from the generalized protocol determined according to IEEE1394 standard into the specialized protocol determined according to MIDI standard.

Figure 4:
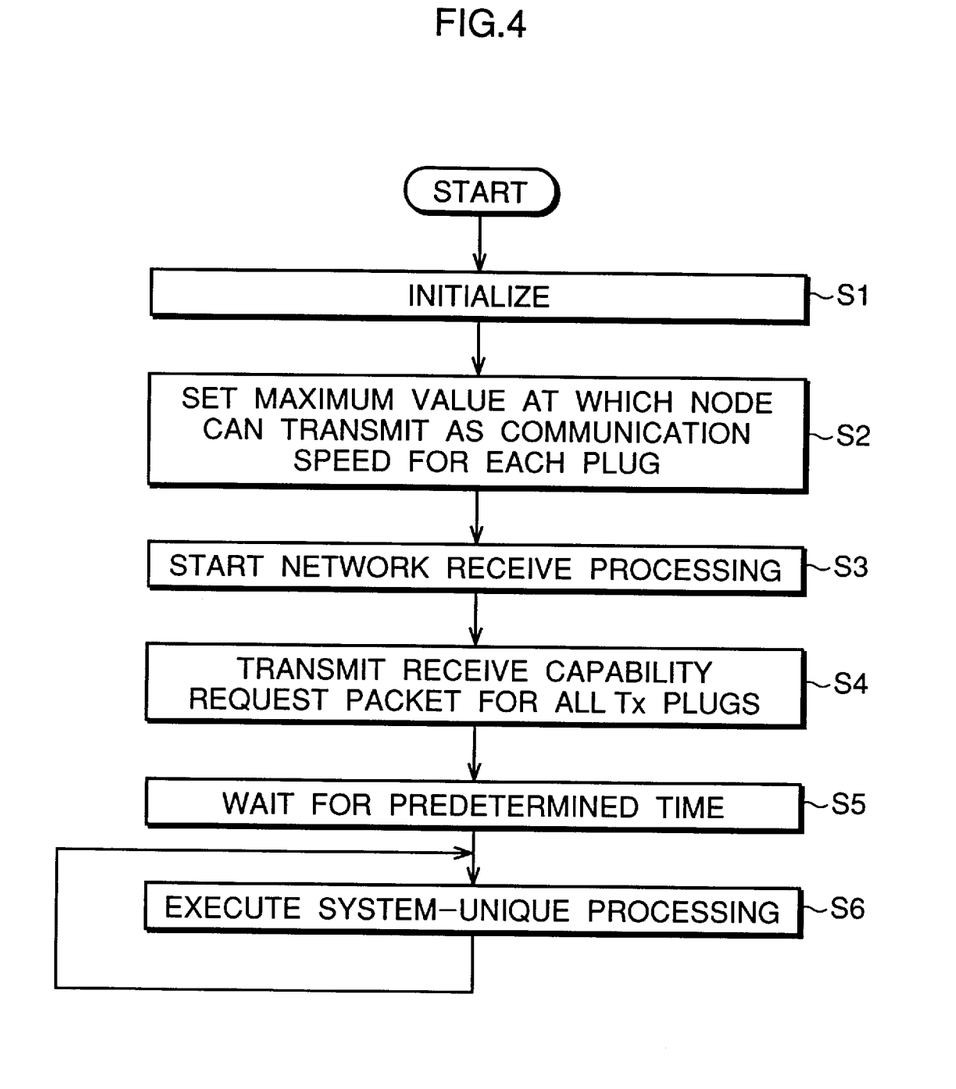
FIG. 4 is a flowchart indicating a main routine performed by each node belonging to a first network in the embodiment.
Figure 5:
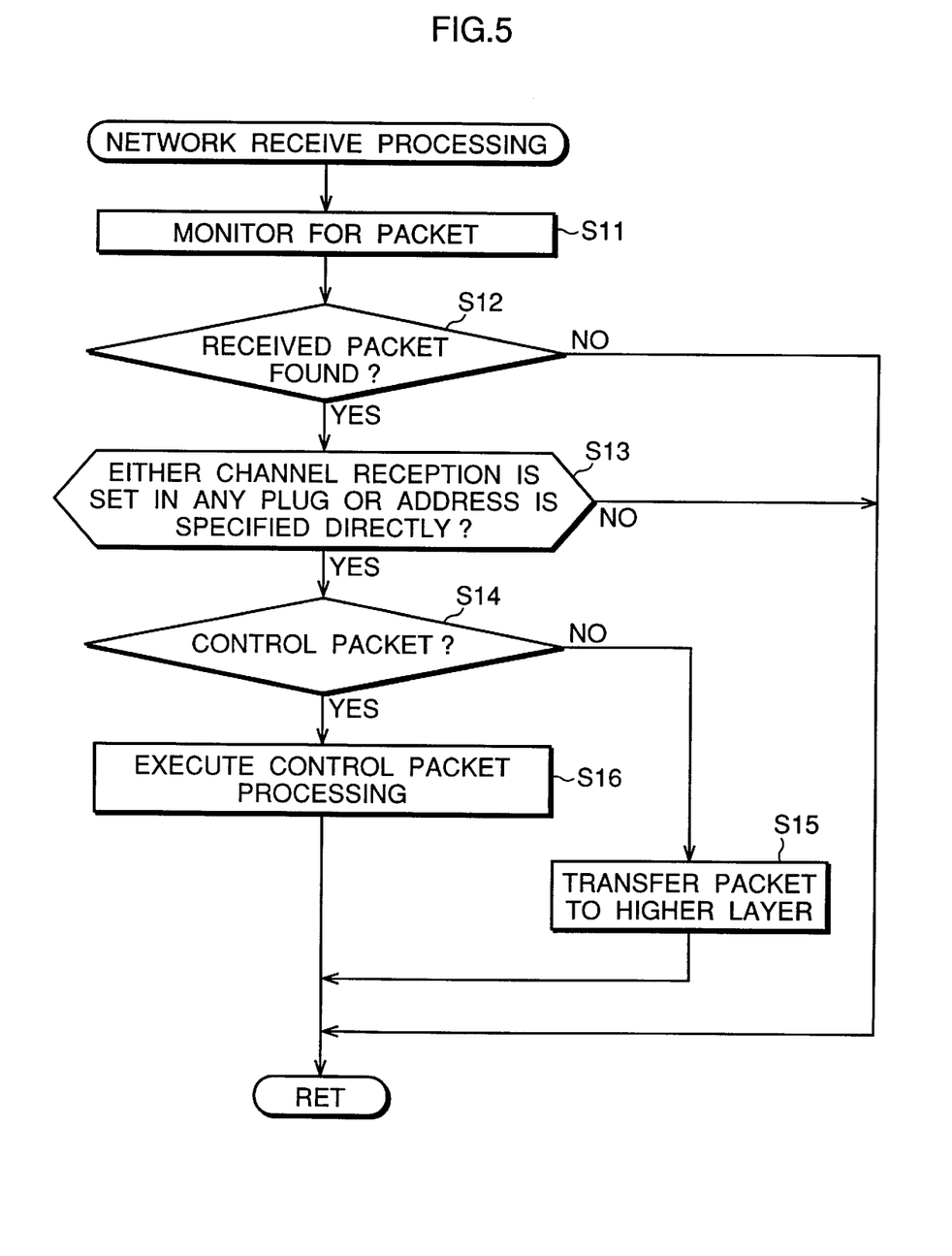
FIG. 5 is a flowchart indicating network receive processing in the embodiment.
Figure 6:
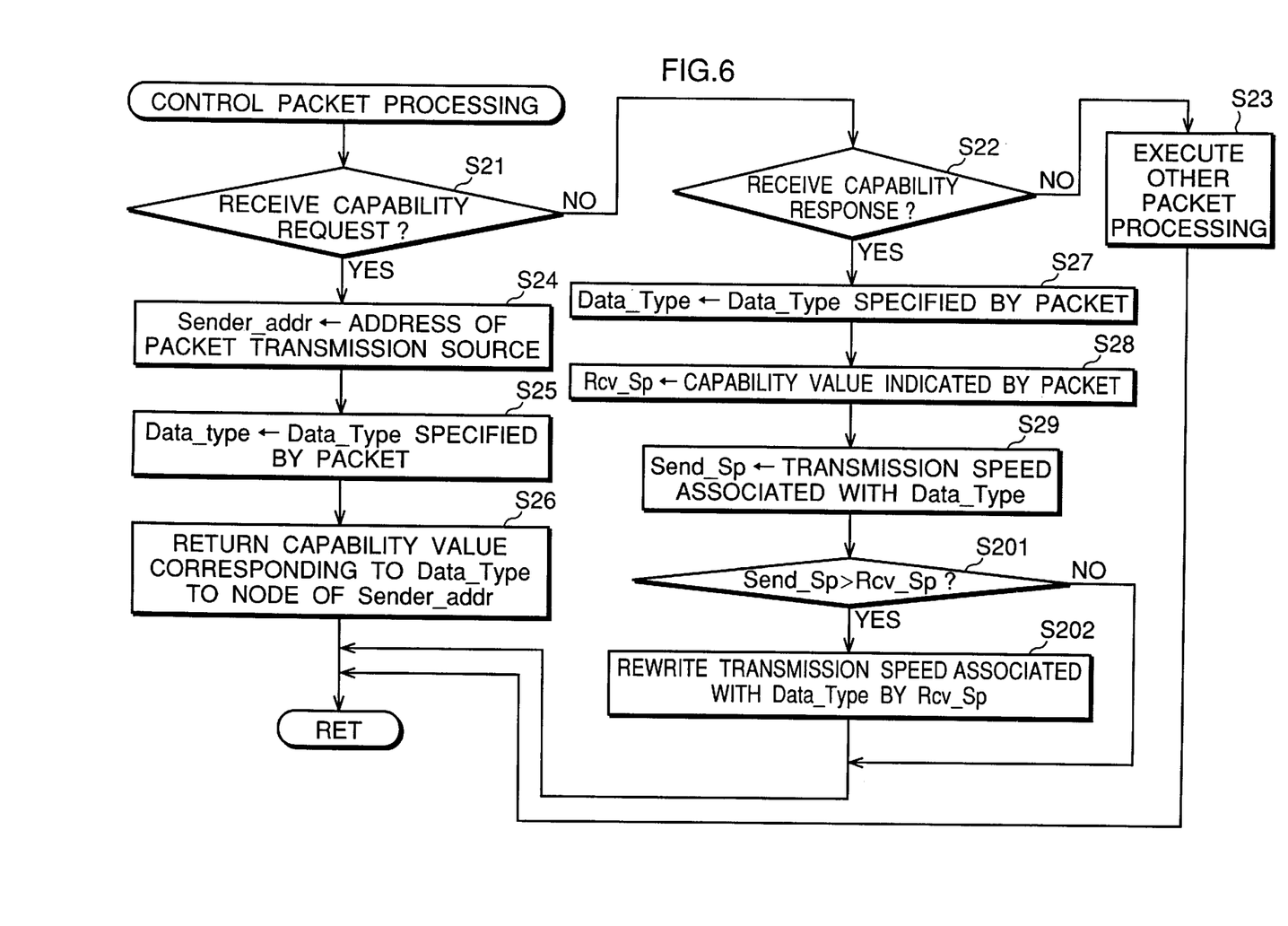
FIG. 6 is a flowchart indicating control packet processing in the embodiment.
Figure 7:
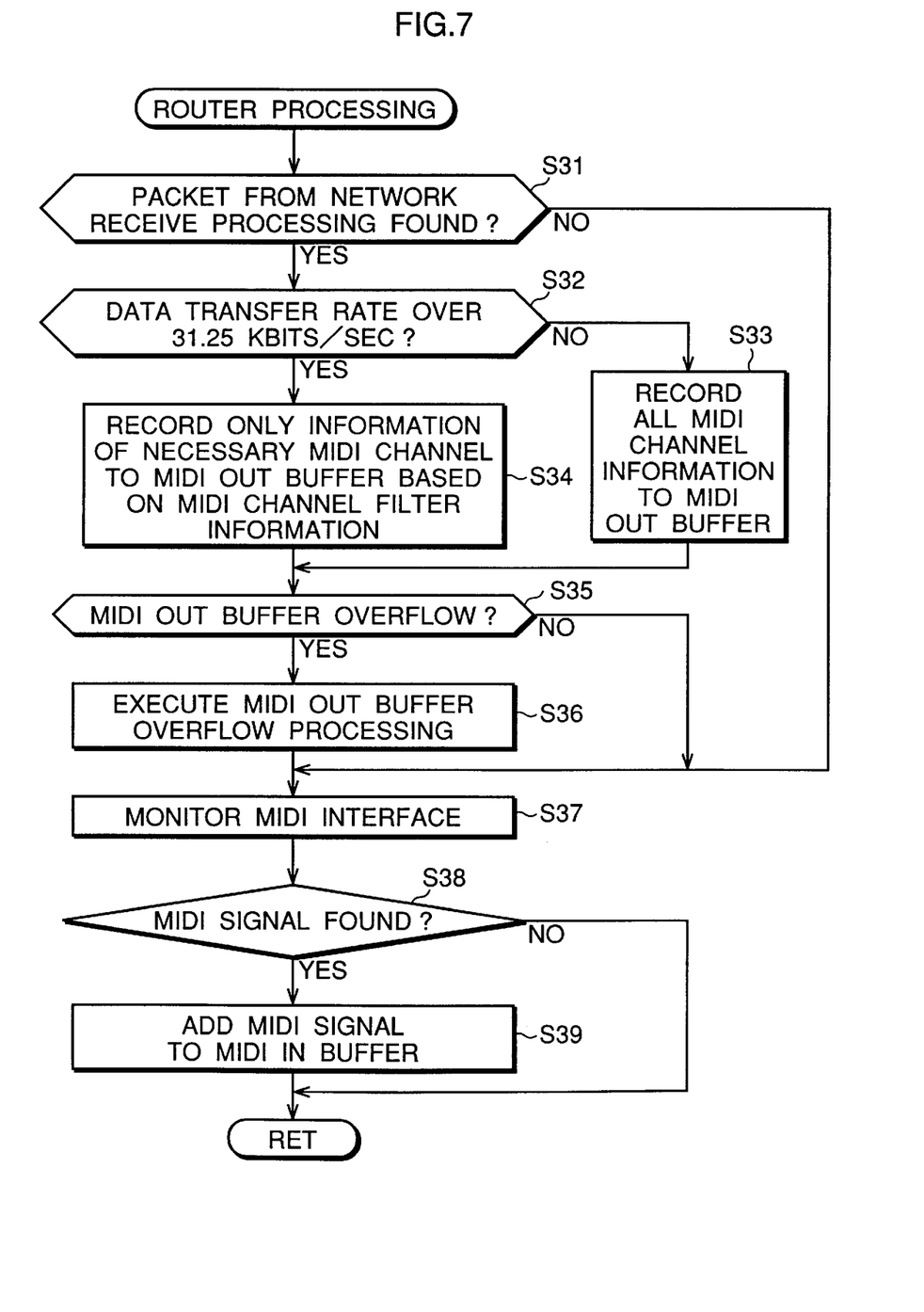
FIG. 7 is a flowchart indicating router processing in the embodiment.
Figure 8:
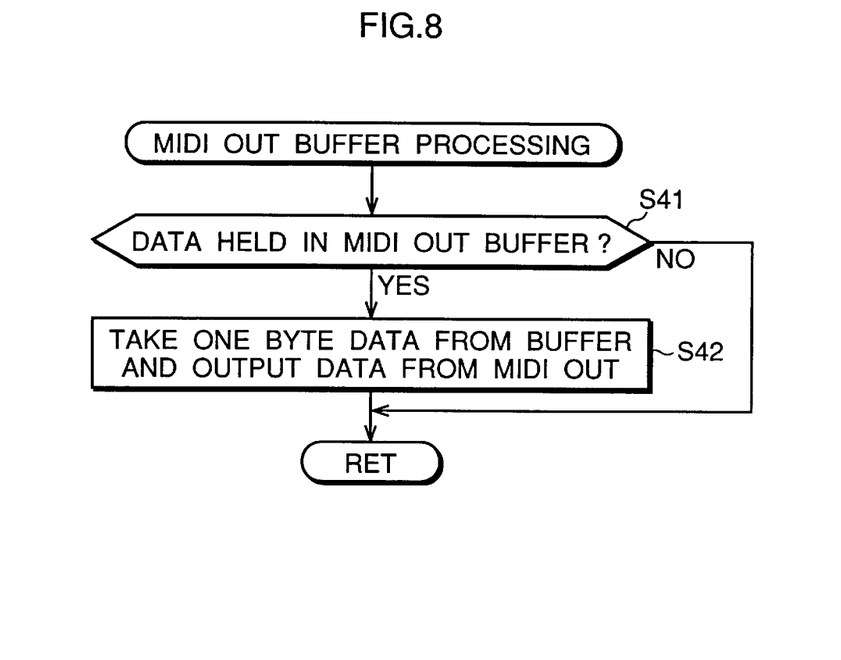
FIG. 8 is a flowchart indicating MIDI OUT buffer processing in the embodiment.
Figure 9:
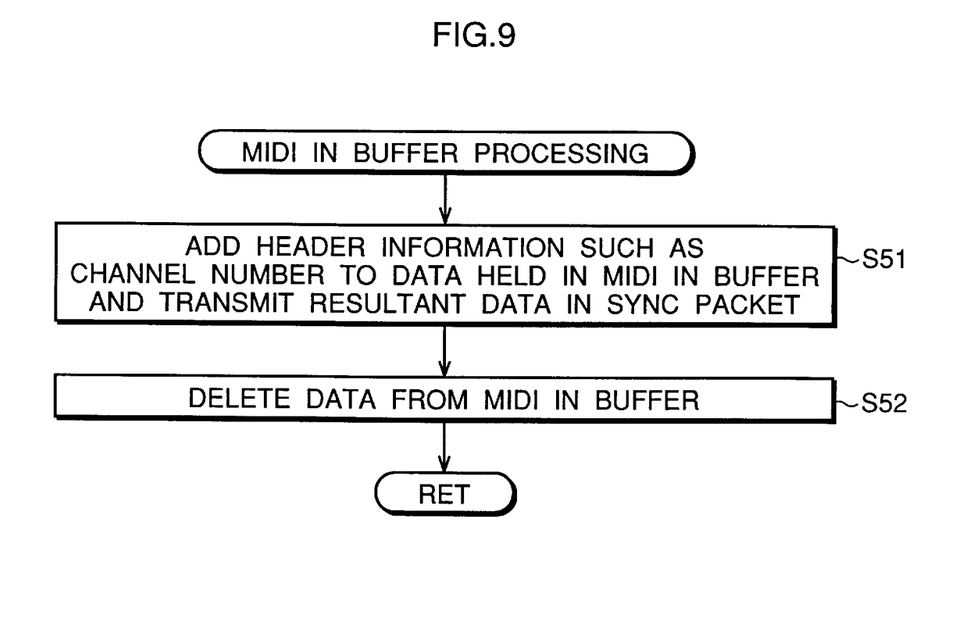
FIG. 9 is a flowchart indicating MIDI IN buffer processing in the embodiment.

FIGS. 4 through 6 are flowcharts indicating operation of a control program executed by the CPU of each node belonging to the first network in the present embodiment. FIG. 7 is a flowchart indicating processing by the router for one example of system-unique processing of each node. FIG. 8 is a flowchart indicating MIDI OUT buffer processing of a node having MIDI interface. FIG. 9 is a flowchart indicating MIDI IN buffer processing of the node having MIDI interface. The following describes the operation of this system with reference to these flowcharts.

The main routine of FIG. 4 starts when the address and logical structure is set upon power-on or bus reset in the system. First, in step S1, the node performs initialization such as clearing transmit and receive buffers and resetting registers. In step S2, for determining the transfer rate of each plug of the node, the node writes the maximum value of each plug to be used by the node for transmission. Next, in step S3, the node starts network receive processing of FIG. 5 and goes to step S4. This network receive processing of FIG. 5 is operated in the background by timer interrupt.

Then, in step S4, for all transmit (Tx) plugs of the node, the node transmits a receive capability request packet to corresponding channels. In step S5, the node waits for a predetermined period of time. Meanwhile, when the receive capability request packet has been broadcast to the corresponding channels, the mate notes connected to these channels return receive capability response packets including address specification. During the wait time of step S5, the node receives the receive capability response packets through the network receive processing started by timer interrupt. According to the contents of the received packets, the node sets the transfer rate of each transmit plug of the node. Also, the node transmits a receive capability response packet in response to a receive capability request packet issued by another node during the wait time of step S 5. When the wait time has passed, the node goes to step S6 to perform the system-unique processing of the node.

Figure 10:
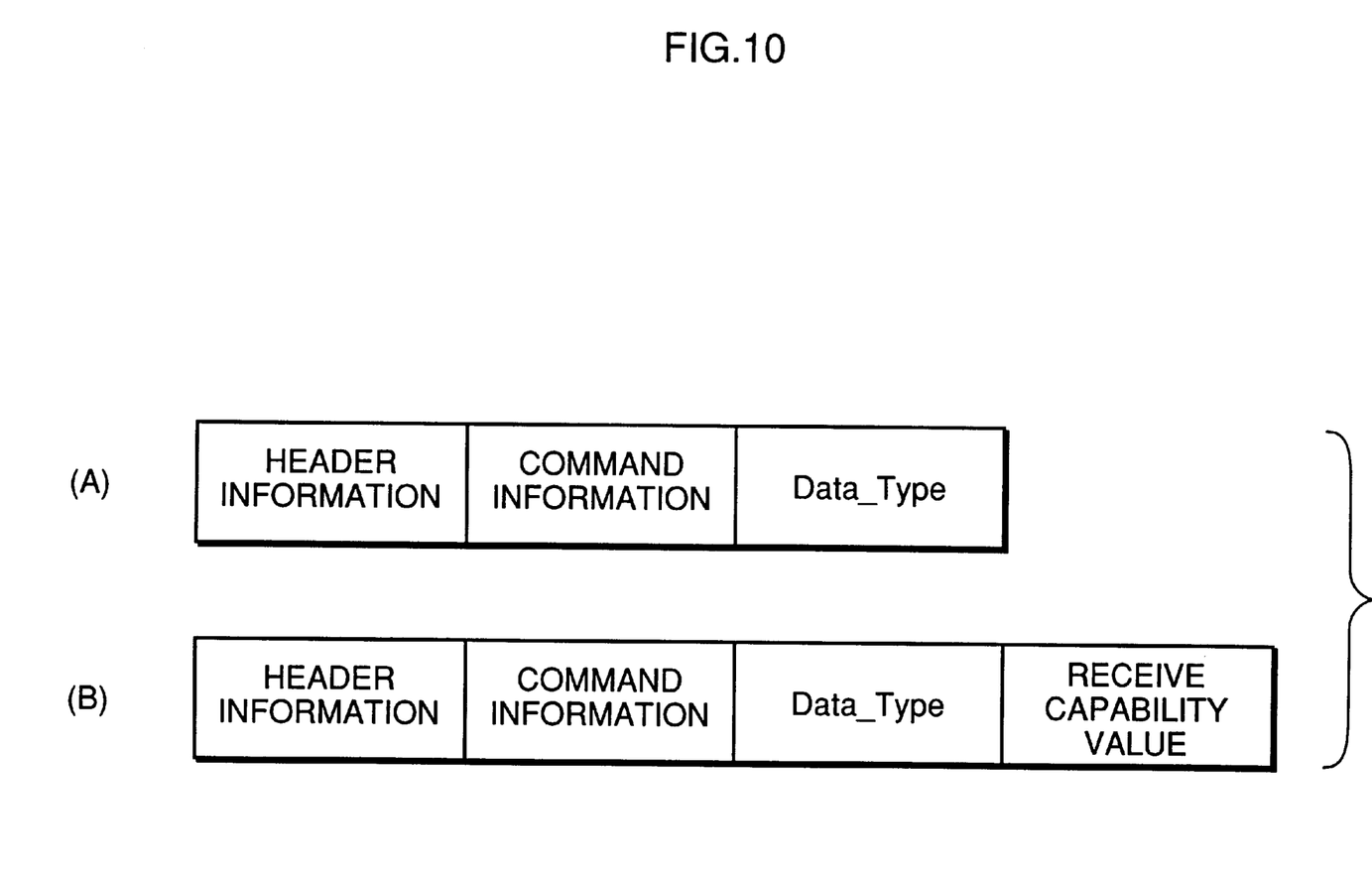
FIG. 10 is a diagram illustrating an example of packet data transferred by the first network in the embodiment.

It should be noted that the packets transferred in the first network have a format as shown in FIG. 10, for example. As shown in FIG. 10, the receive capability request packet (A) is composed of header information, command information, and Data_Type. The receive capability response packet (B) includes a receivable highest transfer rate (hereinafter, referred to as "receive capability value") in addition to header information, command information and Data_Type. The header information records data such as addresses and channel numbers of transmit node and receive node. The command information records predetermined data that indicates whether the type of this packet data is a receive capability request packet or a receive capability response packet. The Data_Type records data that indicates the distinction between PCM data and MIDI message.

The network receive processing of FIG. 5 is started by timer interrupt.

In step S11, the node monitors the packet data. In step S12, the node checks for a received packet. If no received packet is found, the node returns to the previous routine. If a received packet is found, then, in step S13, the node determines either the packet data specifies a channel to which reception (Rx) is set for any of the plugs of the node, or the packet data directly specifies the address of the node. If the determination results in NO, then the node returns to the previous routine. If the determination results in YES, then, in step S14, the node determines whether the packet data is a control packet or not.

The control packet is a receive capability request packet or a receive capability response packet used for controlling the operation of setting the transfer rate. If the received packet data is not a control packet, the data is associated with other processing for a MIDI message or PCM data, so that the node transfers the data to a higher layer (the application layer in which the processing unique to this node is performed) in step S15, and returns to the previous routine. If the packet data is found a control packet, then, in step S 16, the node performs the control packet processing of FIG. 6 and returns to the previous routine.

Registers to be used for control are labeled as follows in the following description and flowchart of FIG. 6. The data to be held in these registers and the contents thereof are represented in the same label unless otherwise notified.

Sender_addr: the register for holding the address of data source.

Data_Type: the register for holding the type of data.

Rcv_Sp: the register for holding receive capability value.

Send_Sp: the register for holding transfer rate.

In the control packet processing of FIG. 6, the node determines in step S21 whether the packet data is a receive capability request. If the packet data is found the receive capability request, the node performs the processing of step S24 and subsequent steps. If not, the node determines in step S22 as to whether the packet data is the receive capability response. If the packet data is found not a receive capability response in step S22, then the node performs other packet processing in step S23 and returns to the previous routine. If the packet data is found a receive capability response, the node performs the processing of step S27 and subsequent steps.

If the packet data is found a receive capability request, the node captures a source address of a requesting node from the packet data into the register Sender_addr in step S24. Then, in step S25, the node captures the Data_Type specified by the packet data into the register Data_Type. Next, in step S26, the node sends the receive capability value of this node corresponding to the Data_Type to the source node which issues of the receive capability request. Namely, the node formulates packet data containing the receive capability value of this node corresponding to the Data_Type, the Sender_addr providing the address of the request source node and the Data_Type, then the node transmits the resultant packet data, and returns to the previous routine.

If the packet data is found a receive capability response, the node captures the Data_Type specified by the packet data into the register Data_Type in step S27, and captures the receive capability value indicated by the packet data into the register Rcv_Sp in step S28. Next, in step S29, the node captures the transfer rate data associated with the channel and the Data_Type of this node into the register Send_Sp.

In step S201, the node determines whether "Send_Sp>Rcv_Sp." If not "Send_Sp>Rcv_Sp," it indicates that the transfer rate associated with the channel and Data_Type of the node is smaller than or equal to the receive capability value (transfer rate) of the receiving node, and therefore communication is enabled without change of thr transfer rate so that the node returns to the previous routine. On the other hand, if "Send_Sp>Rcv_Sp," it indicates that the transfer rate associated with the channel and Data_Type of the node is greater than the receive capability value (transfer rate) of the receiving node, and therefore the receiving node cannot fully receive the data. Therefore, the node rewrites the transfer rate associated with Data_Type by Rcv_Sp in step S202 and returns to the previous routine.

It should be noted that the receive capability request packet is the data specified with a channel. Steps S24 through S26 for treating the control packet processing are executed when it is found that the channel-specified data is received in step S13 of the network receive processing shown in FIG. 5. The receive capability response packet is data specified with the address of the request source node. Steps S27 through S202 are executed when it is found that the data directly specified with address is received in step S13 of the network receive processing.

As described above, in the present embodiment, each node performs the transmission of the receive capability request packet in step S4 of the main routine and executes the control packet processing of FIG. 6, thereby setting the transfer rate of each plug to a level at which communication can be made through the corresponding channel.

Figure 11:
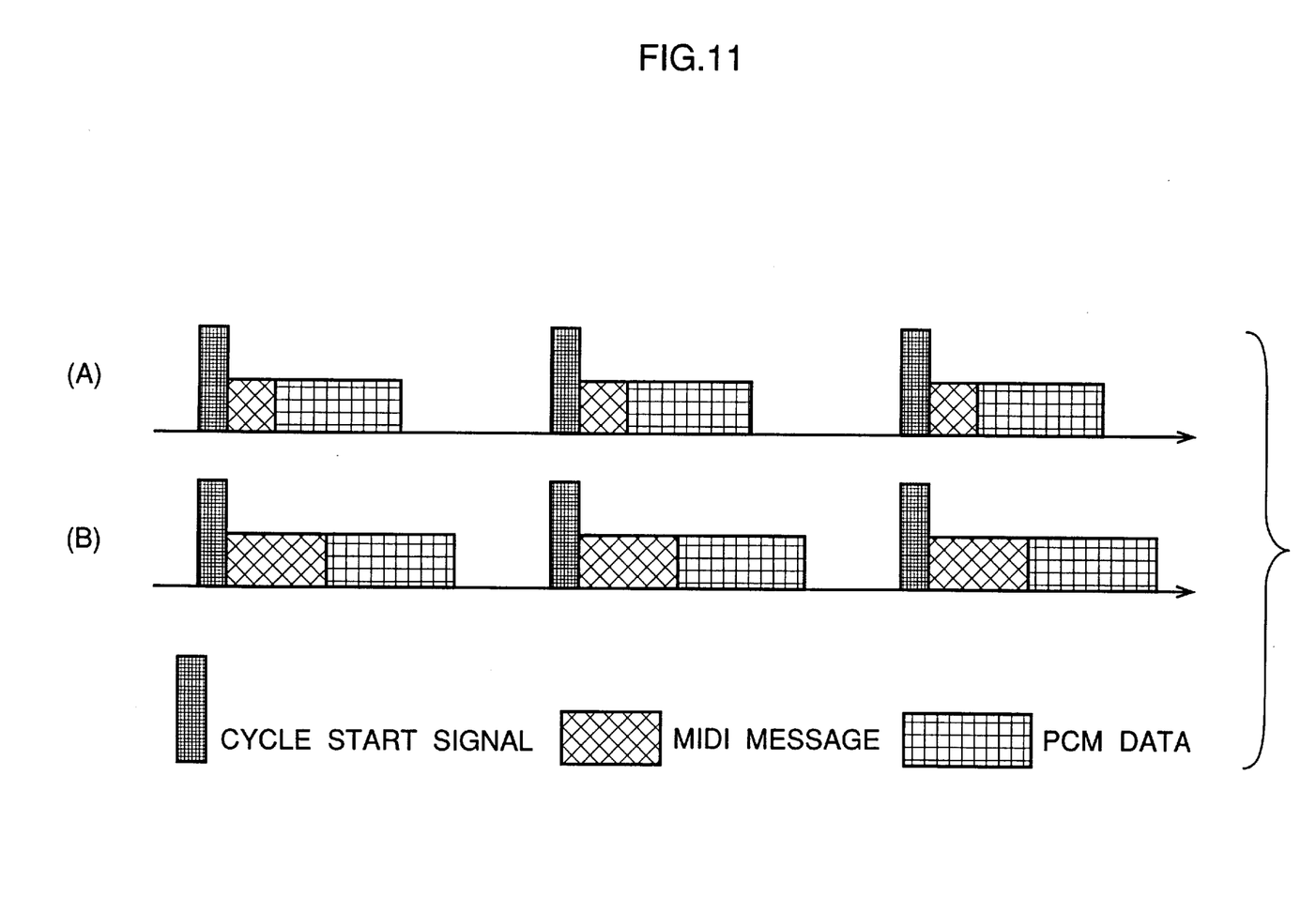
FIG. 11 is a diagram illustrating a manner by which data is transferred through in the first network in the embodiment.

FIG. 11 is a diagram illustrating a manner by which data transfer is made in the first network. This figure also illustrates difference between the transfer rate and the transmission speed in the present embodiment. FIG. 11 (A) corresponds to MIDI transfer rate 31.25 Kbits/sec for example while FIG. 11 (B) corresponds to 64 Kbits/sec, double the rate of FIG. 11 (A). The IEEE 1394 standard has an isochronous mode in which one piece of packet data is routinely transferred in a certain period of time (125 μs) from a sending node to a receiving node. The packet of this isochronous mode is transferred immediately following a cycle start signal outputted in response to the above-mentioned certain period of time. Namely, the transmission speed of signals flowing through the network is constant. However, increasing the transfer rate as shown in FIG. 11 (B) over the level of FIG. 11 (A) means to increase the packet length. The packet length is adjusted to provide a data amount according to the processing capacity of the receiving node. Thus, in the present embodiment, the data transfer amount can be increased as the processing capacity of the receiving node is relatively great, thereby enhancing effective utilization of system resources.

The following describes the processing by the routers with reference to FIG. 7. It should be noted that each router has a panel switch for inputting MIDI channel filter information for specifying a MIDI channel of a MIDI device connected to the router. Based on this MIDI channel filter information, only the MIDI data necessary for that connected MIDI device is outputted from the router.

The router processing of FIG. 7 is performed when packet data other than a control packet is transferred by the network receive processing of step S15. First, the node determines whether there is a packet sent from the network receive processing routine. If no such a packet is found, the node goes to step S37. If such a packet is found, then the node determines whether the transfer rate of the received packet is in excess of 31.25 Kbits/sec in step S32. This data transfer rate can be determined by the data length as shown in FIG. 11, for example. It should be noted that the transfer rate may be written to the header of the data packet beforehand.

If the data transfer rate is found not exceeding 31.25 Kbits/sec, the node records the information of all MIDI channels to the MIDI OUT buffer in step S33, and goes to step S35. If the data transfer rate is found exceeding 31.25 Kbits/sec, the node extracts only the information of the MIDI channel specified by the MIDI channel filter information, records the extracted information to the MIDI OUT buffer, and goes to step S35. Thus, extraction of the information necessary for the specified MIDI channel in step S34 corresponds to selecting only the information for controlling the electronic musical instrument and selecting only the information required by the MIDI device connected to this router. Deleting or filtering information of unnecessary channels enhances the effective utilization of the communication band in the MIDI network slower than the IEEE1394 network.

In step S35, the node determines whether the MIDI OUT buffer is overflowing. If the MIDI OUT buffer is found not overflowing, the node goes to step S37. If the MIDI OUT buffer is found overflowing, the node goes to step S36 to perform overflow processing and then goes to step S37. It should be noted that, in this overflow processing, the information of lower priority is deleted from the buffer. For example, pitch bend data is thinned since the same does not much inversely affect reproducibility of the sound even if omitted. Otherwise, data of pair of key-on and key-off corresponding to relatively small touch or small tone is deleted.

Then, in step S37, the node monitors the MIDI interface. In step S38, the node determines whether there is a MIDI signal. If no MIDI signal is found, the node returns to the previous routine. If a MIDI signal is found, the node writes the MIDI signal to the MIDI IN buffer in step S39 and returns to the previous routine. By the above-mentioned processing, the router 2 and the router 5 transfer all MIDI data coming from the second network to the first network. The routers select from the data coming from the first network only the MIDI data for MIDI device control or electronic musical instrument control, and transfer the selected data to the second network. Also, the routers transfer only the MIDI data required by the destination node or the MIDI device connected to the routers.

In the MIDI OUT buffer processing of FIG. 8, the node determines whether the MIDI OUT buffer holds data in step S41. If no data is found, the node returns to the previous routine. If the data is found, the node extracts one byte data from the MIDI OUT buffer in step S42 and outputs the extracted data from the MIDI OUT terminal according to the MIDI standard, and returns to the previous routine. This MIDI OUT buffer processing is performed when MIDI data is transmitted from the router 5 to the electronic musical instrument 7, or when MIDI data is transmitted from the mixer 4 to the sound system 8. Thus, by the MIDI OUT buffer processing, the data coming from the first network is transferred to the second network in the MIDI protocol.

In the MIDI IN buffer processing of FIG. 9, the node adds header information such as channel number in compliance with the IEEE1394 standard to the data held in the MIDI IN buffer in step S51, and outputs the resultant data from the 1394 interface 40 as a sync packet of the above-mentioned isochronous mode. If the packet is constituted by the data held in the MIDI IN buffer in step S5 1, the data amount of this packet is determined by the transfer rate set by the corresponding channel, or the value set in step S2 or the receive capability value set in step S202 as shown in FIG. 11 (A) or FIG. 11 (B). After transmitting the packet, the node deletes data from the MIDI IN buffer in step S52 and returns to the previous routine. This MIDI IN buffer processing is performed when the MIDI data transmitted from the electronic musical instrument 6 to the router 2 is passed to the sequencer 3 or the mixer 4 as a packet by the router 2. Thus, by the MIDI IN buffer processing, the data from the MIDI device is transferred in the IEEE1394 protocol. The above-mentioned router processing has been described by use of the router node as an example of the system-unique processing of the node. In other nodes such as the first tone generator 1, the sequencer 3, the mixer 4 and the third tone generator 9, similar system-unique processing is also performed. The data amount of a packet to be transmitted from one node to another node in the first network is determined according to the transfer rate adaptively set to the channel of transmission.

As described above, the inventive system comprises a multimedia network composed of first nodes which generally treat multimedia information including music information transferred through the multimedia network in a generalized protocol, and a musical network composed of second nodes which specially treat music information transferred through the musical network in a specialized protocol. The system includes an interface node for connecting between the multimedia network and the musical network. The interface node comprises an input device that operates when the musical network communicates with the multimedia network for converting the music information from the specialized protocol into the generalized protocol so that the multimedia network can admit the music information from the musical network, and an output device that operates when the multimedia network communicates with the musical network for converting the music information from the generalized protocol into the specialized protocol so that the musical network can admit the music information from the multimedia network. Typically, the interface node comprises one of the first nodes involved in the multimedia network and connected to one of the second nodes involved in the musical network.

Preferably, the input device unconditionally converts the music information transmitted by the second node such that the first node having a relatively large capacity receives all messages contained in the music information, while the output device conditionally converts the music information transmitted by the first node such that the second node having a relatively small capacity receives only messages necessary for the second node. The output device is integrated in the first node and selectively converts only messages which are provisionally designated by the second node. Further, the output device operates when the second node suffers from overflow of the music information for selectively converting only indispensable messages so as to resolve the overflow.

Typically, the multimedia network adopts the generalized protocol determined according to IEEE1394 standard, while the musical network adopts the specialized protocol determined according to MIDI standard. In such a case, the first nodes are coupled to each other through bi-directional cables to transfer the music information thereamong, while a second node transmitting the musical information is coupled to the input device of the interface node through a unidirectional cable and another second node receiving the music information is coupled to the output device of the interface node through another unidirectional cable. The interface node interfaces between the multimedia network which transfers the music information at a relatively fast rate according to the generalized protocol and the music network which transfers the music information at a relatively slow rate according to the specialized protocol so that the input device unconditionally receives the slow rate of the music information from the musical network while the output device conditionally transmits the fast rate of the music information so as to adjust for the slow rate in the musical network. The first nodes operate when physically coupled to each other for automatically routing the multimedia information among the first nodes to set up the multimedia network.

Thus, the inventive network system is constituted by the communication standard having a high transmission speed like the IEEE1394 standard. For connecting a device having a low transfer rate such as a MIDI device of which internal processing is slow to the network system, the data amount to be transmitted in one packet may be decreased in accordance with that low transfer rate. For a device having a high transfer rate such as an advanced MIDI device of which internal processing is fast, the data amount to be transmitted in one packet may be increased in accordance with that high transfer rate.

Namely, according to the present embodiment, each node in the first network sets a transfer rate at which data is transferable for each transfer channel, thereby making the most of the capability of the node as far as possible without being limited by the MIDI standard. The conventional MIDI standard makes it difficult to constitute a network because of the low transfer rate and the unidirectional communication. The novel setup according to the present invention can constitute a multimedia network that can process image information in addition to performance information in the first network (the IEEE1394 standard). Moreover, the novel setup can constitute a network with conventional MIDI devices through the router, thereby making the most of the hardware and software based on the MIDI standard.

The machine readable media 80 shown in FIG. 3 contains instructions for causing the interface node composed of a personal computer machine to perform the operation of connecting between a first node involved in a multimedia network which generally treats multimedia information including music information transferred in a generalized protocol, and a second node involved in an musical network which specially treats music information transferred in a specialized protocol. The operation comprises an input step of converting the music information from the specialized protocol into the generalized protocol when the second node communicates with the first node so that the first node can admit the music information from the second node, and an output step of converting the music information from the generalized protocol into the specialized protocol when the first node communicates with the second node so that the second node can admit the music information from the first node. The input step unconditionally converts the music information transmitted by the musical network such that the multimedia network having a relatively large capacity receives all messages contained in the music information, while the output step conditionally converts the music information transmitted by the multimedia network such that the musical network having a relatively small capacity receives only messages necessary for the musical network. The output step selectively converts only messages which are provisionally designated by the musical network. The output step selectively converts only indispensable messages when the musical network suffers from overflow of the music information so as to resolve the overflow.

What is claimed is:

1. An interface apparatus for connecting between a first node involved in a multimedia network which generally treats multimedia information including music information transferred in a generalized protocol, and a second node involved in a musical network which specially treats music information transferred in a specialized protocol, the interface apparatus comprising:

an input device that operates when the second node communicates with the first node for converting the music information from the specialized protocol into the generalized protocol so that the first node can admit the music information from the second node, and an output device that operates when the first node communicates with the second node for converting the music information from the generalized protocol into the specialized protocol so that the second node can admit the music information from the first node, wherein the input device unconditionally converts the music information transmitted by the second node such that the first node having a relatively large capacity receives all messages contained in the music information, while the output device conditionally converts the music information transmitted by the first node such that the second node having a relatively small capacity receives only messages necessary for the second node.

2. An interface apparatus according to claim 1, wherein the input device and the output device are integrated in the first node.

3. An interface apparatus according to claim 1, wherein the output device is integrated in the first node and selectively converts only messages which are provisionally designated by the second node.

4. An interface apparatus according to claim 1, wherein the output device operates when the second node suffers from overflow of the music information for selectively converting only indispensable messages so as to resolve the overflow.

5. An interface apparatus for connecting between a first node involved in a multimedia network which generally treats multimedia information including music information transferred in a generalized protocol, and a second node involved in a musical network which specially treats music information transferred in a specialized protocol, the interface apparatus comprising:

an input device that operates when the second node communicates with the first node for converting the music information from the specialized protocol into the generalized protocol so that the first node can admit the music information from the second node, and an output device that operates when the first node communicates with the second node for converting the music information from the generalized protocol into the specialized protocol so that the second node can admit the music information from the first node, wherein the input device converts the music information from the specialized protocol determined according to MIDI standard into the generalized protocol determined according to IEEE1394 standard, while the output device converts the music information from the generalized protocol determined according to IEEE1394 standard into the specialized protocol determined according to MIDI standard.

6. A routing apparatus integrated into a first node involved in a multimedia network which generally treats multimedia information including music information transferred in a modern protocol, for interfacing a second node involved in a musical network which specially treats music information transferred in a classic protocol, the routing apparatus comprising:

receiver means operative when the second node communicates with the first node for converting the music information from the classic protocol into the modern protocol so that the first node can receive the music information from the second node, and transmitter means operative when the first node communicates with the second node for converting the music information from the modern protocol into the classic protocol so that the first node can transmit the music information to the second node, wherein the receiver means unconditionally converts the music information issued by the second node such that the first node having a relatively large capacity admits all messages contained in the music information, while the transmitter means conditionally converts the music information issued by the first node such that the second node having a relatively small capacity admits only messages necessary for the second node.

7. A routing apparatus according to claim 6, wherein the transmitter means selectively converts only messages which are provisionally designated by the second node.

8. A routing apparatus according to claim 6, wherein the transmitter means operates when the second node suffers from overflow of the music information for selectively converting only indispensable messages so as to resolve the overflow.

9. A system comprising:

a multimedia network composed of first nodes which generally treat multimedia information including music information transferred through the multimedia network in a generalized protocol;

a musical network composed of second nodes which specially treat music information transferred through the musical network in a specialized protocol; and an interface node for connecting between the multimedia network and the musical network, the interface node comprising an input device that operates when the musical network communicates with the multimedia network for converting the music information from the specialized protocol into the generalized protocol so that the multimedia network can admit the music information from the musical network, and an output device that operates when the multimedia network communicates with the musical network for converting the music information from the generalized protocol into the specialized protocol so that the musical network can admit the music information from the multimedia network, wherein the interface node comprises one of the first nodes involved in the multimedia network and connected to one of the second nodes involved in the musical network, wherein the input device unconditionally converts the music information transmitted by the second node such that the first node having a relatively large capacity receives all messages contained in the music information, while the output device conditionally converts the music information transmitted by the first node such that the second node having a relatively small capacity receives only messages necessary for the second node.

10. A system according to claim 9, wherein the output device is integrated in the first node and selectively converts only messages which are provisionally designated by the second node.

11. A system according to claim 9, wherein the output device operates when the second node suffers from overflow of the music information for selectively converting only indispensable messages so as to resolve the overflow.

12. A system comprising:

a multimedia network composed of first nodes which generally treat multimedia information including music information transferred through the multimedia network in a generalized protocol;

a musical network composed of second nodes which specially treat music information transferred through the musical network in a specialized protocol; and an interface node for connecting between the multimedia network and the musical network, the interface node comprising an input device that operates when the musical network communicates with the multimedia network for converting the music information from the specialized protocol into the generalized protocol so that the multimedia network can admit the music information from the musical network, and an output device that operates when the multimedia network communicates with the musical network for converting the music information from the generalized protocol into the specialized protocol so that the musical network can admit the music information from the multimedia network, wherein the multimedia network adopts the generalized protocol determined according to IEEE1394 standard, while the musical network adopts the specialized protocol determined according to MIDI standard.

13. A system comprising:

a multimedia network composed of first nodes which generally treat multimedia information including music information transferred through the multimedia network in a generalized protocol;

a musical network composed of second nodes which specially treat music information transferred through the musical network in a specialized protocol; and an interface node for connecting between the multimedia network and the musical network, the interface node comprising an input device that operates when the musical network communicates with the multimedia network for converting the music information from the specialized protocol into the generalized protocol so that the multimedia network can admit the music information from the musical network, and an output device that operates when the multimedia network communicates with the musical network for converting the music information from the generalized protocol into the specialized protocol so that the musical network can admit the music information from the multimedia network, wherein the first nodes are coupled to each other through be-directional cables to transfer the music information theramong, while a second node transmitting the musical information is coupled to the input device of the interface node through a unidirectional cable and another second node receiving the music information is coupled to the output device of the interface node through another unidirectional cable.

14. A system according to claim 9, wherein the interface node interfaces between the multimedia network which transfers the music information at a relatively fast rate according to the generalized protocol and the music network which transfers the music information at a relatively slow rate according to the specialized protocol so that the input device unconditionally receives the slow rate of the music information from the musical while the output device conditionally transmits the fast rate of the music information so as to adjusts for the slow rate in the musical network.

15. A system according to claim 9, wherein the first nodes operate when physically coupled to each other for automatically routing the multimedia information among the first nodes to set up the multimedia network.

16. A method of integrating networks, comprising the steps of:

setting up a multimedia network composed of first nodes which generally treat multimedia information including music information transferred through the multimedia network in a generalized protocol;

setting up a musical network composed of second nodes which specially treat music information transferred through the musical network in a specialized protocol; and interfacing between the multimedia network and the musical network, the interfacing step comprising an input step of converting the music information from the specialized protocol into the generalized protocol when the musical network communicates with the multimedia network so that the multimedia network can admit the music information from the musical network, and an output step of converting the music information from the generalized protocol into the specialized protocol when the multimedia network communicates with the musical network so that the musical network can admit the music information from the multimedia network, wherein the input step unconditionally converts the music information transmitted by the music network such that the multimedia network having a relatively large capacity receives all messages contained in the music information, while the output step conditionally converts the music information transmitted by the musical network such that the musical network having a relatively small capacity receives only messages necessary for the second node.

17. A method according to claim 16, wherein the output step converts only messages which are provisionally designated by the musical network.

18. A method according to claim 16, wherein the output step selectively converts only indispensable messages when the musical network suffers from overflow of the music information so as to resolve the overflow.

19. A method of integrating networks, comprising the steps of:

setting up a multimedia network composed of first nodes which generally treat multimedia information including music information transferred through the multimedia network in a generalized protocol;

setting up a musical network composed of second nodes which specially treat music information transferred through the musical network in a specialized protocol; and interfacing between the multimedia network and the musical network, the interfacing step comprising an input step of converting the music information from the specialized protocol into the generalized protocol when the musical network communicates with the multimedia network so that the multimedia network can admit the music information from the musical network, and an output step of converting the music information from the generalized protocol into the specialized protocol when the multimedia network communicates with the musical network so that the musical network can admit the music information from the multimedia network, wherein the interfacing step interfaces between the multimedia network which transfers the music information at a relatively fast rate according to the generalized protocol and the music network which transfers the music information at a relatively slow rate according to the specialized protocol so that the input step unconditionally receives the slow rate of the music information from the musical network while the output step conditionally transmits the fast rate of the music information so as to adjust for the slow rate in the musical network.

20. A machine readable media containing instructions for causing an interface machine to perform the operation of connecting between a first node involved in a multimedia network which generally treats multimedia information including music information transferred in a generalized protocol, and a second node involved in a musical network which specially treats music information transferred in a specialized protocol, wherein the operation comprises:

an input step of converting the music information from the specialized protocol into the generalized protocol when the second node communicates with the first node so that the first node can admit the music information from the second node, and an output step of converting the music information from the generalized protocol into the specialized protocol when the first node communicates with the second node sot that the second node can admit the music information from the first node, wherein the input step unconditionally converts the music information transmitted by the musical network such that the multimedia network having a relatively large capacity receives all messages contained in the music information, while the output step conditionally converts the music information transmitted by the multimedia network such that the musical network having a relatively small capacity receives only messages necessary for the musical network.

21. A machine readable media according to claim 20, wherein the output step selectively converts only messages which are provisionally designated by the musical network.

22. A machine readable media according to claim 20, wherein the output selectively converts only indispensable messages when the musical work suffers from overflow of the music information so as to resolve the flow.

23. A machine readable media containing instructions for causing an interface machine to perform the operation of connecting between a first node involved in a multimedia network which generally treats multimedia information including music information transferred in a generalized protocol, and a second node involved in a musical network which specially treats music information transferred in a specialized protocol, wherein the operation comprises:

an input step of converting the music information from the specialized protocol into the generalized protocol when the second node communicates with the first node so that the first node can admit the music information from the second node, and an output step of converting the music information from the generalized protocol into the specialized protocol when the first node communicates with the second node sot that the second node can admit the music information from the first node, wherein the input step converts the music information from the specialized protocol determined according to MIDI standard into the generalized protocol determined according to IEEE1394 standard, while the output step converts the music information from the generalized protocol determined according to IEEE1394 standard into the specialized protocol determined according to MID standard.

* * * * *